Figure 1:
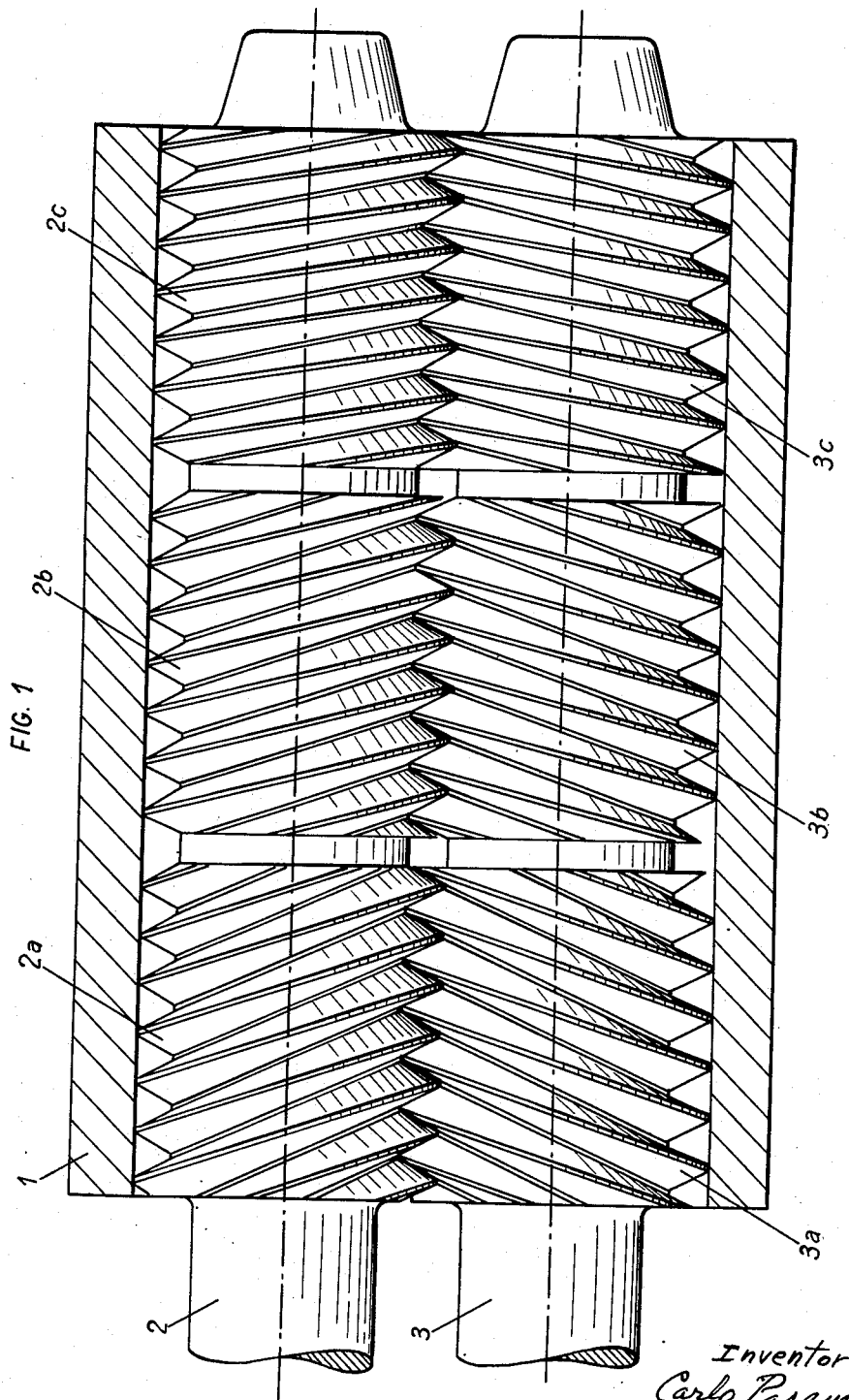

April 27, 1954

C. PASQUETTI 2,676,355

SCREW PRESS, MORE PARTICULARLY FOR EXTRUDING PLASTIC MATERIALS

Filed March 7, 1951

2 Sheets-Sheet 2

Inventor
Carlo Pasquetti
by Albert J Jacobs
Atty.

Patented Apr. 27, 1954

2,676,355

UNITED STATES PATENT OFFICE 2,676,355

SCREW PRESS, MORE PARTICULARLY FOR EXTRUDING PLASTIC MATERIALS

Carlo Pasquetti, Varese, Italy

Application March 7, 1951, Serial No. 214,233

Claims priority, application Italy March 8, 1950

5 Claims. (Cl. 18—12)

This invention relates to screw presses employed for extruding plastic materials, such as thermoplasts for the production of granules for injection moulding and for extruding shapes generally.

In known extrusion machines of this type having either one screw or a plurality of intermeshing screws, various provisions have been made for effecting an increasing compression of the material as it travels through the press for plasticizing, compressing and extruding it. These provisions consist chiefly in varying the pitch from the inlet to the extrusion die, in employing screws with a decreasing thread diameter and an increasing core diameter, the increase and decrease, respectively, being gradual or by steps.

The use of intermeshing screws subdivided into sections differing in diameter of the screw thread and core complicates the construction of the screws and casing of the press, and excessively weakens the screw core. Moreover, this type of press is subject to rapid wear which places the screw and casing out of use after a relatively short time.

This invention provides a screw press which effects a compression and mixing equivalent to those obtained by multiple stepped screws, avoiding at the same time the above-mentioned drawbacks of a technical character. Moreover, according to this invention it is possible to process on a commercial scale by extrusion rawstuffs of a very low specific weight, which was practically impossible with the known screw presses.

The increasing compression on the material is effected by subdividing the screw or screws of the press between the inlet opening and extrusion die into two or more sections, each of which has a number of threads lower than the preceding section.

The screws may be of constant diameter or they may be slightly conical in order to easily make up by an axial displacement for the wear of the cooperating surfaces of the screw and casing.

Besides the advantages of simplicity in construction and improved life, the press according to this invention permits with respect to known stepped presses of increasing the contact surface, inasmuch as the depth of the screw threads, all other conditions being equal, is smaller. This affords a greater absorption of heat per unit of time by the material to be extruded and amalgamated, whereby the efficiency may be increased and the quality of the article improved.

The variation in number of the screw threads in the press may be combined with a gradual reduction in pitch. According to a further feature of the invention, in order to reduce friction between the screw and casing and to improve flow of the plastic materials, more particularly in the case of interengaging screws, the screw threads are formed at their apices with a curved semi-circular form profile.

Moreover, for processing rawstuffs very light in weight the press may be combined with a pressure feed device for supplying the material to the press casing. This device may be in the form of one or a plurality of successive pairs of toothed wheels of which the thread is helical or otherwise inclined with respect to the axis, in accordance with applicant's British Patent No. 638,364. Alternatively the material may be forced by means of two rollers, smooth, milled, or with nonintermeshing teeth, which may rotate inwardly.

Figure 2:
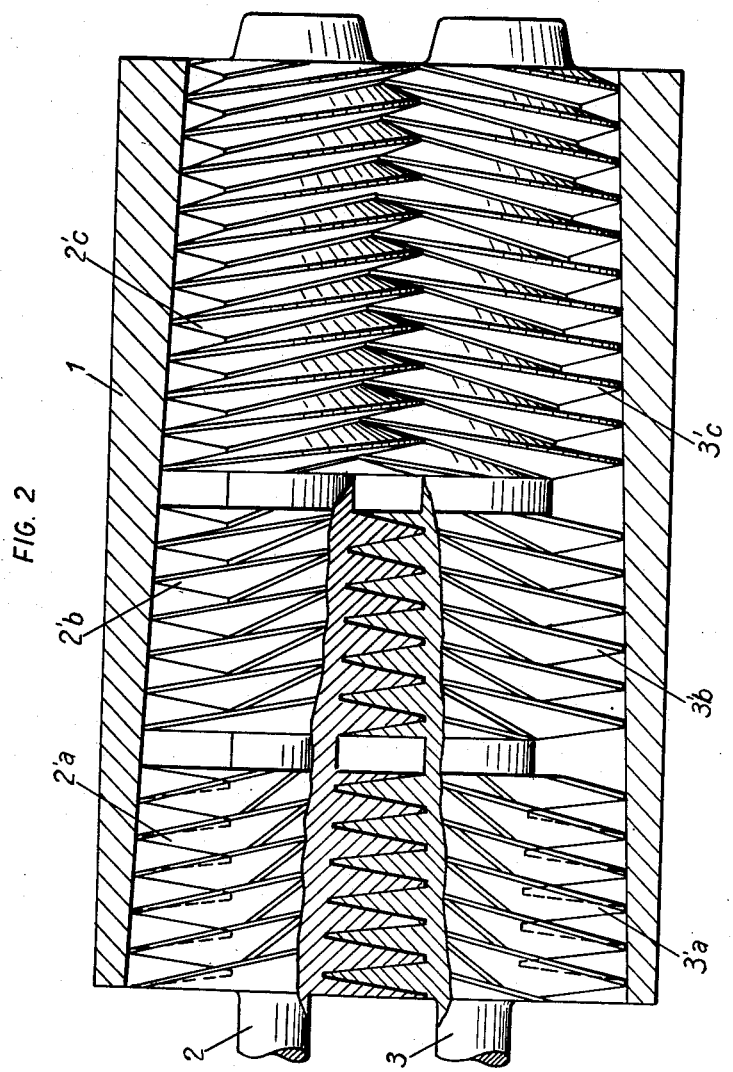

The invention is further described with reference to the annexed diagrammatic drawings, which show two constructions thereof by way of example, and in which:

Figure 1 is a part longitudinal section of a press according to this invention, and Figure 2 shows a modification of Figure 1.

The press shown in Figure 1 comprises a cylindrical casing 1 provided with heating means and having at one end an inlet opening and at the other end an extrusion die. The shafts 2 and 3 of two interengaging multiple thread screws rotate in the casing 1. Each screw is made up of three sections 2a, 2b, 2c and 3a, 3b, 3c, respectively, having a decreasing number of threads in the direction of feed of the material between the inlet opening and extrusion die. More particularly the sections 2a, 3a, 2b, 3b, 2c, 3c, have four, three and two screw threads, respectively.

In the drawing the three sections of each screw have been shown for the sake of simplicity equal in length; in practice, the lengths may be different and vary in each case according to requirements. Moreover, in the construction shown in Figure 2 the cores of the screws may be more conveniently made of a larger diameter, as shown in Figure 1.

In the modification shown in Figure 2, the casing 1 is made with an inner conical surface which matches the profile of the surface tangential to the apex of the screw threads of the two screws. Each screw is made up of three sections 2'a, 2'b, 2'c and 3'a, 3'b, 3'c, respectively, over which the number of the threads varies as in the former construction. The conicity of the screws permits making up any play due to wear by an axial displacement. Although in the constructions shown and two interengaging screws are oppositely inclined, and are therefore adapted to counter-rotate, it will be obvious that they may be equally inclined and rotate in the same direction.

Similarly, and without departing from the scope of this invention, presses with one multiple thread screw or with three or more interengaging screws may be constructed.

What I claims is:

1. A screw press for extruding synthetic thermoplastic resins comprising a casing provided at one end with an inlet opening and at its other end with an extrusion die and a multiple thread screw rotating in said casing about an axis parallel with the axis of the casing, the inner surface of the casing being tangential to the apexes of the threads of said screw and said screw being subdivided into sections, in each screw section the ratio between the lead and linear pitch being smaller than that of the preceding screw section in the direction of feed of the material between said inlet opening and said extrusion die.

2. A screw press for extruding synthetic thermoplastic resins comprising a casing provided at one end with an inlet opening and at its other end with an extrusion die, intermeshing multiple thread screws having parallel axes arranged to rotate in said casing, in which the thread of each screw completely fills the spaces between the threads of the screw or screws intermeshing with the same, the inner surface of said casing being tangential to the perimeter of the unintermeshing portions of said screws and each screw being subdivided into sections, in each screw section the ratio between the lead and linear pitch being smaller than that of the preceding screw section in the direction of feed of the material between said inlet opening and said extrusion die.

3. A screw press for extruding synthetic thermoplastic resins comprising a casing provided at one end with an inlet opening and at its other end with an extrusion die, intermeshing multiple thread screws having parallel axes arranged to rotate in said casing, in which the thread of each screw completely fills the spaces between the threads of the screw or screws intermeshing with the same, the inner surface of said casing being tangential to the perimeter of the unintermeshing portions of said screws and each screw being subdivided into sections, in each screw section the ratio between the lead and linear pitch being smaller than that of the preceding screw section in the direction of feed of the material between said inlet opening and said extrusion die, the core of the screws being of maximum constant diameter over all its length.

4. A screw press for extruding synthetic thermoplastic resins comprising a casing provided at one end with an inlet opening and at its other end with an extrusion die, intermeshing multiple thread screws having parallel axes arranged to rotate in said casing, in which the thread of each screw completely fills the spaces between the threads of the screw or screws intermeshing with the same, the inner surface of said casing being tangential to the perimeter of the unintermeshing portions of said screws and each screw being subdivided into sections, in each screw section the ratio between the lead and linear pitch being smaller than that of the preceding screw section in the direction of feed of the material between said inlet opening and said extrusion die, the surface tangential to the threads of each screw being a surface of low conicity.

5. A screw press for extruding synthetic thermoplastic resins comprising a casing provided at one end with an inlet opening and at its other end with an extrusion die, intermeshing multiple thread screws having parallel axes arranged to rotate in said casing, in which the thread of each screw completely fills the spaces between the threads of the screw or screws intermeshing with the same, the inner surface of said casing being tangential to the perimeter of the unintermeshing portions of said screws and each screw being subdivided into sections, in each screw section the ratio between the lead and linear pitch being smaller than that of the preceding screw section in the direction of feed of the material between said inlet opening and said extrusion die, the apexes of the screw threads being of approximately semi-circular profile in section.

References Cited in the file of this patent

UNITED STATES PATENTS

| Number | Name | Date |
| --- | --- | --- |
| 2,048,286 | Pease | July 21, 1936 |

FOREIGN PATENTS

| Number | Country | Date |
| --- | --- | --- |
| 240,500 | Switzerland | Apr. 16, 1946 |
| 901,347 | France | Oct. 30, 1944 |